C. N. McCANDLISH & J. C. NAGINEY.
Harvesters.
No. 137,614. Patented April 8, 1873.
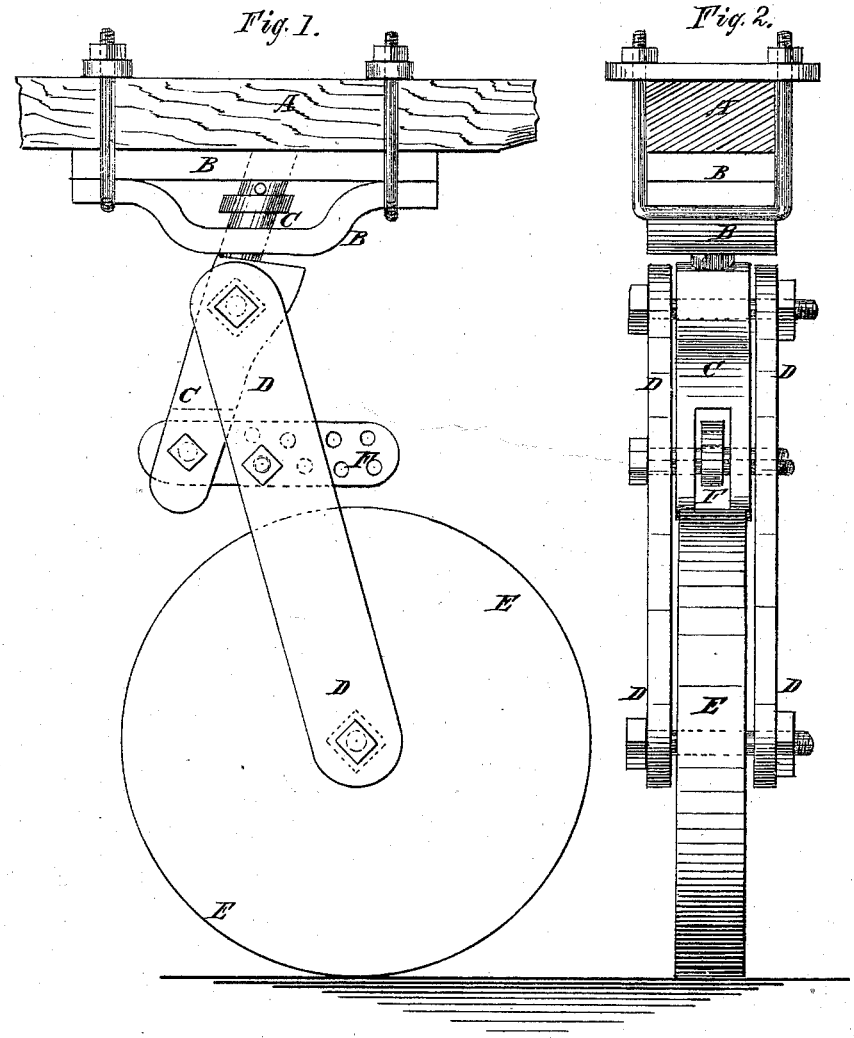

UNITED STATES PATENT OFFICE.

CHARLES N. McCANDLISH AND JOHN C. NAGINEY, OF WEST RUSHVILLE, O.

IMPROVEMENT IN HARVESTERS.

Specification forming part of Letters Patent No. 137,614, dated April 8, 1873; application filed November 30, 1872.

*To all whom it may concern:*

Be it known that we, CHARLES N. MC-CANDLISH and JOHN C. NAGINEY, of West Rushville, in the county of Fairfield and State of Ohio, have invented a new and useful Improvement in Supporting-Wheel for the Tongue of Front-Cut Harvesters, of which the following is a specification:

Figure 1 is a side view of our improved device. Fig. 2 is a front view of the same.

Similar letters of reference indicate corresponding parts.

Our invention has for its object to furnish an improved device for supporting the tongue of front-cut harvesters to relieve the horses' necks from the weight, and which shall be simple in construction, conveniently applied, and effective in operation. The invention consists in the particular means by which the wheel is attached to the tongue, as hereinafter described and pointed out in the claim.

A represents the tongue of a harvester, to which, near the point where the double-tree is attached, is secured a block or bar or plate, B, by stirrups, yokes, and nuts, as shown in Figs. 1 and 2, or by other convenient means. In the middle part of the bar or block B is formed a hole to receive the pivot or journal of the swiveled bar C, said bar or block B having a slot formed in it to receive the pin and washer, by which the pivoted arm C is secured to said bar B. The bar or block B may be made in one or two pieces, as may be desired or convenient. To the upper part of the bar or arm C are pivoted the upper ends of the bars D, which pass down upon the opposite sides of the wheel E, and their lower ends are connected by a bolt which passes through the hub of the said wheel, and serves as its journal. To the lower end of the arm C is pivoted the end of a short bar, F, which has a number of holes formed in it, as shown in Fig. 1. The bar F passes between the bars D, where it is adjustably secured in place by a pin or bolt, which passes through a hole in the bars D, and through one of the holes in the bar F, so that by shifting the said pin or bolt from one to the other of the holes in the said bar F the tongue may be adjusted higher or lower, according to the height of the horses.

Having thus described our invention, we claim as new and desire to secure by Letters Patent—

The described means for connecting the tongue A and wheel E, consisting of the yoke-held plate B, the pivoted arm C, the pivoted bars D D, and the pivoted bar F, constructed in all respects substantially as and for the purposes set forth.

CHARLES N. McCANDLISH.
JOHN C. NAGINEY.

Witnesses:
JACOB HUNSAKER,
WALTER J. DROHAN.